UNITED STATES PATENT OFFICE.

DOMENICO MOTTURA, OF DULUTH, MINNESOTA, ASSIGNOR TO UNIVERSAL REMEDIES COMPANY, OF ST. LOUIS COUNTY, MINNESOTA, A CORPORATION.

LINIMENT.

1,412,129.  Specification of Letters Patent.  Patented Apr. 11, 1922.

No Drawing.  Application filed June 3, 1919.  Serial No. 301,571.

*To all whom it may concern:*

Be it known that I, DOMENICO MOTTURA, a citizen of the United States, residing at Duluth, in the county of St. Louis and State of Minnesota, have invented certain new and useful Improvements in Liniments, of which the following is a specification.

This invention has as its object to provide a novel liniment for the treatment of rheumatism and other ailments for the relief of which liniments are ordinarily employed, the composition embodying the invention being adapted both for human use and for veterinary use.

The liniment consists of the following ingredients compounded in approximately the percentages recited.

| Ingredient | Percent |
|---|---|
| Castor oil | 4 per cent |
| Water | 26 " |
| Salt | 5 " |
| Salt niter (potassium nitrate) | 10 " |
| Ashantee or West African pepper | 15 " |
| Pine tar | 10 " |
| Verbena essence | 5 " |
| Venice turpentine | 25 " |

In compounding the ingredients the water, salt, Ashantee pepper and salt niter are mixed and boiled until the concoction thereof of the desired strength has been obtained whereupon the remaining ingredients are added and thoroughly incorporated by stirring. After standing for a suitable period of time, the mixture is strained and is then ready for use.

Having thus described the invention, what is claimed as new is:

A liniment consisting of a mixture of castor oil four per cent, salt five per cent, potassium nitrate ten per cent, Ashantee pepper fifteen per cent, pine tar ten per cent, verbena essence five per cent, Venice turpentine twenty-five per cent, and water.

In testimony whereof I affix my signature.

DOMENICO MOTTURA. [L. S.]